United States Patent
Nazarov et al.

(10) Patent No.: US 9,607,332 B1
(45) Date of Patent: Mar. 28, 2017

(54) EMBEDDED WEB APPLICATION GALLERY

(71) Applicant: GOOGLE INC., Mountain View, CA (US)

(72) Inventors: Sergey Nazarov, Moscow (RU); Aleksey Surkov, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/175,663

(22) Filed: Feb. 7, 2014

(51) Int. Cl.
*G06Q 30/00* (2012.01)
*G06Q 30/06* (2012.01)
*G06F 17/22* (2006.01)
*G06F 3/0481* (2013.01)

(52) U.S. Cl.
CPC ..... *G06Q 30/0631* (2013.01); *G06F 3/04817* (2013.01); *G06F 17/2247* (2013.01); *G06Q 30/0641* (2013.01)

(58) Field of Classification Search
CPC ............ G06Q 30/0601–30/0645; G06Q 30/08
USPC ................................................. 705/26.1–27.2
See application file for complete search history.

(56) References Cited

U.S. PATENT DOCUMENTS

| | | | |
|---|---|---|---|
| 8,255,280 B1 * | 8/2012 | Kay ..................... | G06F 21/53 705/26.1 |
| 8,612,470 B1 * | 12/2013 | Fushman et al. ........... | 707/767 |
| 2008/0184157 A1 * | 7/2008 | Selig .......................... | 715/781 |
| 2011/0307354 A1 * | 12/2011 | Erman ...................... | G06F 8/60 705/27.1 |
| 2012/0017178 A1 * | 1/2012 | Mulloy et al. ............... | 715/835 |
| 2012/0095878 A1 * | 4/2012 | Feldman et al. ............ | 705/27.1 |
| 2012/0221384 A1 * | 8/2012 | Avadhanam et al. ....... | 705/14.4 |
| 2013/0198029 A1 * | 8/2013 | Mowatt ................. | G06Q 10/10 705/26.7 |
| 2014/0114901 A1 * | 4/2014 | Pradhan et al. ............... | 706/50 |
| 2014/0136937 A1 * | 5/2014 | Patel et al. .................... | 715/212 |

OTHER PUBLICATIONS

Skaggs, Matt, How to Open an email attachment from your yahoo account, (Captured: Sep. 22, 2012), Houston Chronicle, https://web.archive.org/web/20120922160354/http://smallbusiness.chron.com/open-email-attachment-yahoo-account-47662.html.*

* cited by examiner

*Primary Examiner* — Resha Desai
*Assistant Examiner* — Lindsey Smith
(74) *Attorney, Agent, or Firm* — Brake Hughes Bellermann LLP

(57) ABSTRACT

A method includes receiving, at a client computing device, a list of web applications from a network device associated with a digital goods marketplace, receiving, at the client computing device, metadata associated with the list of web applications, generating, at the client computing device, a user interface including at least one icon representing a web application available for download from the digital marketplace, and displaying the user interface in a browser of the client computing device.

19 Claims, 12 Drawing Sheets

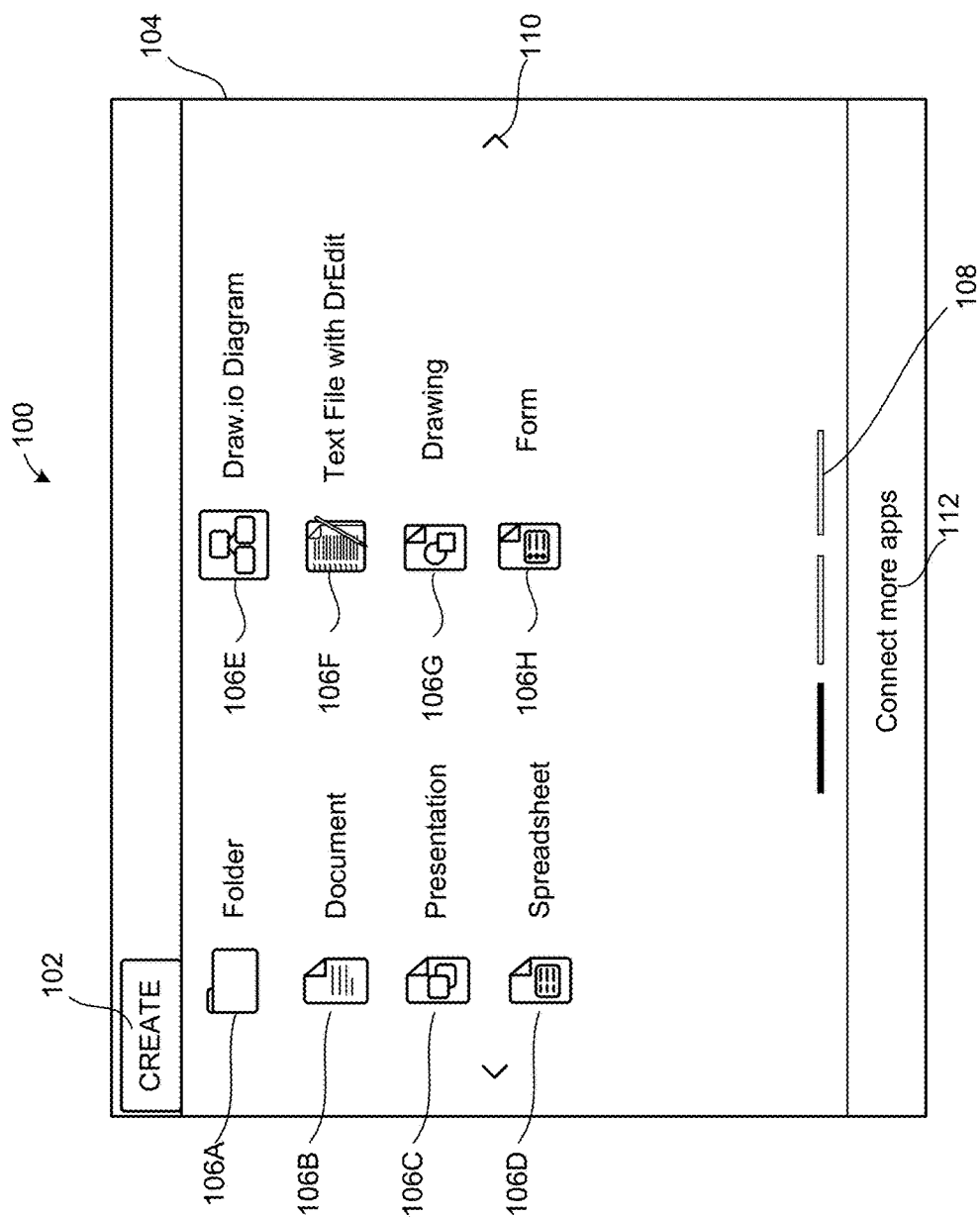

EMBEDDED WEB APPLICATION GALLERY

TECHNICAL FIELD

This disclosure relates to the discovery and display of web applications available in an online marketplace.

BACKGROUND

When web applications are offered in an online marketplace, an overwhelming number of applications may exist in the marketplace. Further, each of the web applications may or may not be associated another web application (or group of applications), a file type, a user and the like. Therefore, there exists a need to display only a few web applications to the user at one time on a user interface that are best suited for the user. In addition, the user may be interfacing with an application (e.g., an email application) and have a need to interact with an unknown application (e.g., as an attached file). Therefore, there exists a need to display only web applications associated with the unknown application (that are included in the online marketplace) to the user at one time on a user interface within the application that the user is interfacing with.

SUMMARY

In a general aspect, a method may include receiving, at a client computing device, a list of web applications from a network device associated with a digital goods marketplace, receiving, at the client computing device, metadata associated with the list of web applications, generating, at the client computing device, a user interface including at least one icon representing a web application available for download from the digital market place, and displaying the user interface in a browser of the client computing device.

In another general aspect, a computer readable medium may include code segments that, when executed by a processor of a client computing device, cause the processor to receive a list of web applications from a network device associated with a digital goods marketplace, receive metadata associated with the list of web applications, generate a user interface including at least one icon representing a web application available for download from the digital market place, and display the user interface in a browser of the client computing device. The list of web applications may be a filtered list. The filter may be based on an application associated with a browser executing on the client computing device. The metadata may include an icon associated with each web application in the list of web applications.

Implementations can include one or more of the following features. For example, the list of web applications may be based on an application being executed in the browser of the client computing device. The application executing in the browser of the client computing device may be a hosted file system, and the list of web applications may represent web applications available for download from the digital market place, which can be utilized to generate a file to be stored in the hosted file system. The application executing in the browser of the client computing device may be an email application, and the list of web applications may represent web applications, available for download from the digital market place, that can be utilized to operate on a file attached to an email.

For example, the list of web applications may represent web applications, available for download from the digital market place. The web applications may include scripts that can be executed in association with the application. The application executing in the browser of the client computing device may be an enterprise application, and the list of web applications may represent web applications, available for download from the digital market place that are associated with the enterprise application. The generating of the user interface may include selecting a portion of the web applications in the list of web applications based on a ranking of each of the web applications in the list of web applications such that the user interface includes only the icons associated with the portion of the web applications.

For example, the user interface may include at least two headings. A first heading may be associated with a portion of the web applications in the list of web applications based on a ranking of each of the web applications in the list of web applications, and a second heading may be associated with at least one related web application previously installed on the client computing device.

For example, the method may also include detecting an event configured to trigger display of web applications available from the digital goods marketplace, and determining at least one query parameter based on the event. The list of web applications may be based on the at least one query parameter. For example, the method may also include detecting a selection of a web application for installation on the client computing device based on a selection of the at least one icon, and installing, on the client computing device, the selected web application from the digital goods marketplace.

In yet another general aspect, a method may include loading a web application in a digital goods marketplace server, determining an identification number for the loaded web application, and loading the web application into an embeddable web application server with a reference to the identification number for the loaded web application. The loading of the web application into the embeddable web application server may include loading an associated manifest file including a declaration of an association between the web application and at least one other web application that may be executed in a browser of a client computing device.

BRIEF DESCRIPTION OF THE DRAWINGS

FIGS. 1A and 1B are screenshots of a user interface for an embeddable web application gallery.

DETAILED DESCRIPTION

Figure 1B:
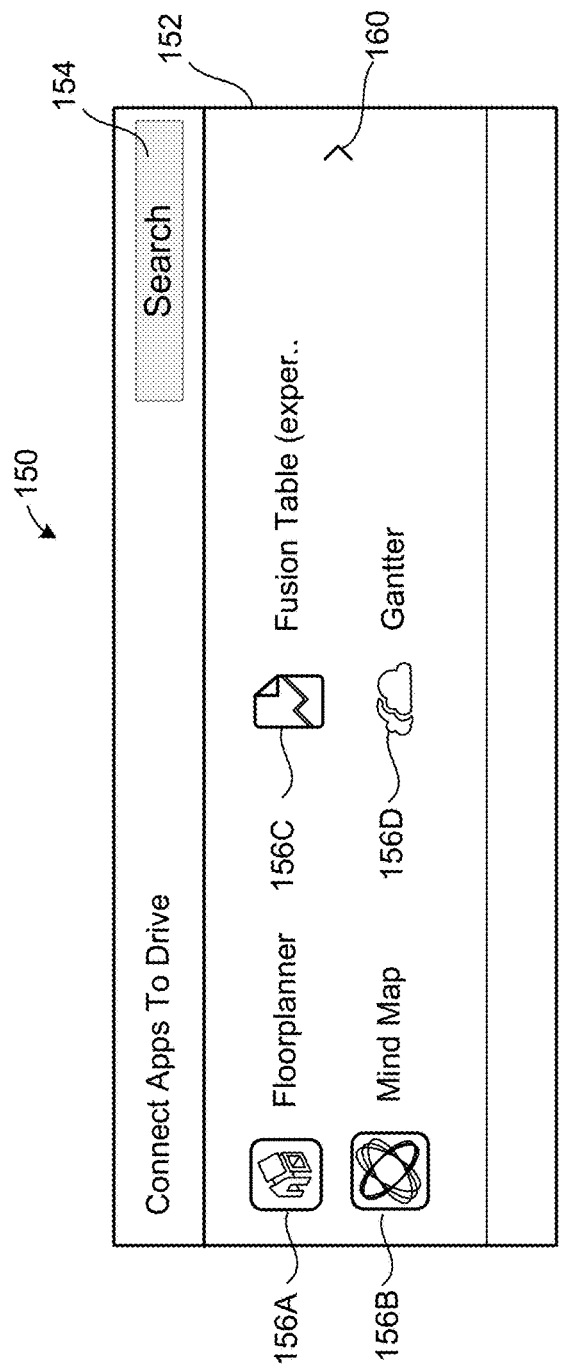

FIGS. 1A and 1B are screenshots of user interface 100 and 150 for an embeddable web application gallery. The user interface 100 can be displayed by a browser application that is executed by a computing device that may be connected to a network (e.g., the Internet). The browser application can open one or more tabs, one of which may display the user interface 100 (e.g., as a pop-up HTML or iFrame window) when a user interacts with some triggering event (e.g., a mouse click on a button) associated with an application or webpage being displayed by the browser application.

In the example of FIG. 1A, the user interface 100 may be associated with a hosted file system or drive application being displayed by the browser application. A hosted file system is an Internet hosting service configured to host user files. A hosted file system may allow users to upload files that can be accessed over the internet from a different computer, tablet, smart phone or other networked device, by the same user or possibly by other users, after a password or other authentication is provided. Hosted file systems may be configured to provide file backup, file access, file distribution, folder synchronization (e.g., automatic back-up and sharing across user devices of files and/or folder(s)), and/or the like. For example, the user interface 100 may be associated with the Google Drive® application. In an example implementation, a user may click on button 102 to create a new file for association with the drive. In response to the section of button 102, a gallery 104 of icons 106A, 106B, 106C, 106D, 106E, 106F, 106G, 106H representing web applications that may be used to create the new file is displayed. The user may page through the displayed web applications to additional icons (not shown) using tabs 108 or arrow 110.

In addition, the user may search for additional web applications by clicking on link 112 which opens user interface 150. User interface 150 may include a gallery 152 of icons 156A, 156B, 156C, 156D representing web applications that may be used to create the new file. The user may page through the displayed web applications to additional icons (not shown) using arrow 160 or search through the UI using search textbox 154.

As discussed in more detail below, the gallery 152 may include icons (e.g., icon 156B) that represent web applications that are available in a marketplace of digital goods. The web applications may or may not be "installed" on the device (e.g., computer, cell phone or tablet) being operated by the user at the time the web application is to be used. Therefore, the user interface 100 is configured to display icons associated with a list or data set of web applications available in the marketplace of digital goods that are filtered and/or sorted for use with the application (e.g., hosted file system or drive, file type, etc.) the user is interacting with. The list of web applications may be acquired and/or received from the marketplace of digital goods, a server including the marketplace of digital goods and/or a server associated with the marketplace of digital goods.

Figure 2:
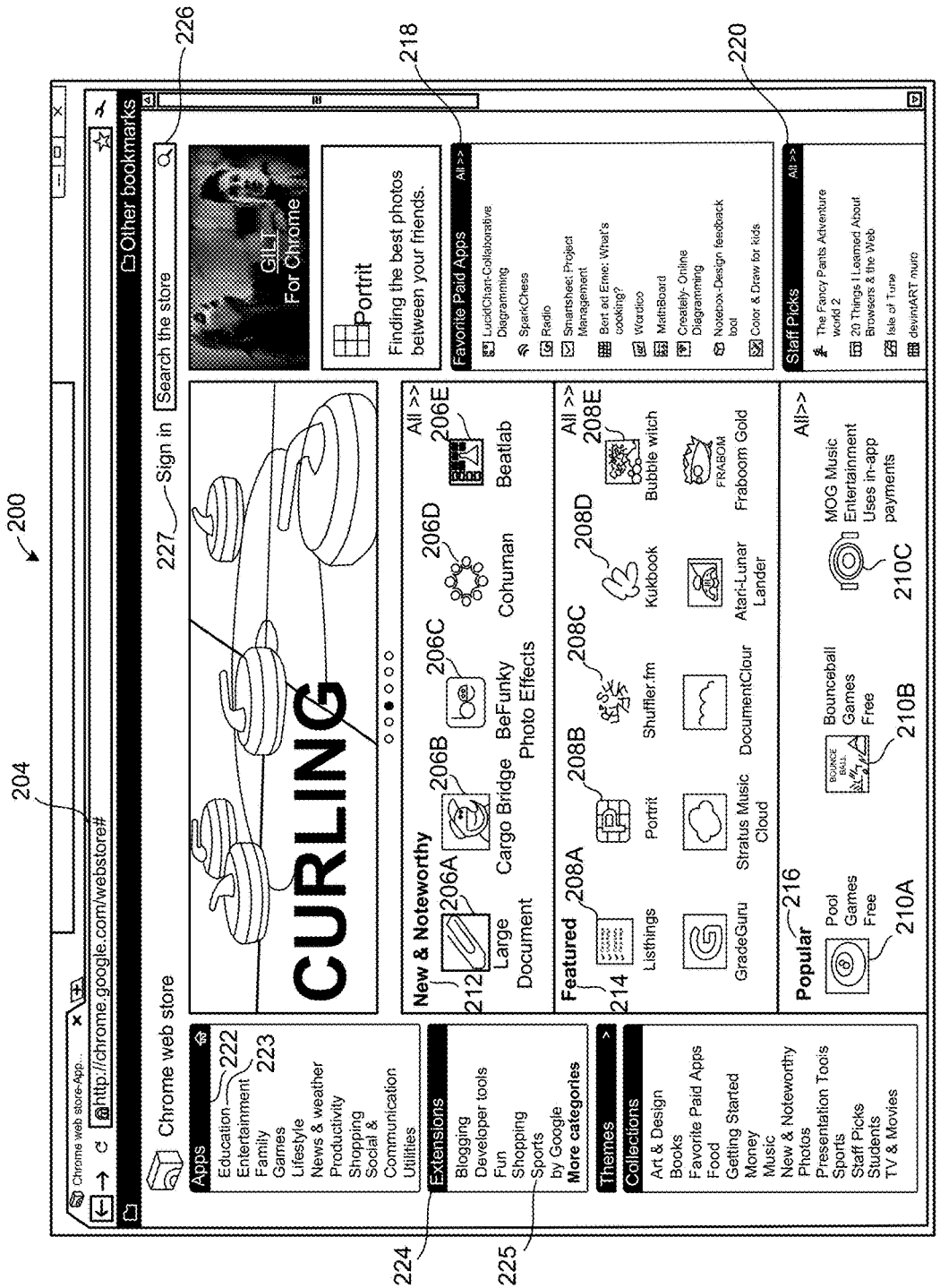
FIG. 2 is a screenshot of the user interface to a marketplace of digital goods.

FIG. 2 is a screenshot of a user interface 200 to a marketplace of digital goods. The user interface 200 can be displayed by a browser application that is executed by a computing device that may be connected to a network (e.g., the Internet). The browser application can open one or more tabs 202, one of which may display the user interface to the marketplace when a user navigates to a webpage identified by a uniform resource locator (URL) that provides content to the browser so that the browser can display the user interface to the marketplace in the tab.

The content provided by the webpage to the user can include a plurality of icons 206A, 206B, 206C, 206D, 206E, 206F, 208A, 208B, 208C, 208D, 208E, 210A, 210B, 210C that represent digital goods that can be downloaded from the webpage by the user for execution by a computing device controlled by the user. In some implementations, the digital goods can include any software or executable code (e.g., a desktop software program, a native application, a digital media file, such as a song or a movie, etc.). In some implementations, the digital goods can include web applications and browser extensions that can be downloaded from the marketplace to a client computing device where they can be installed on the computing device for execution by a web browser running on the computing device. In this context, a "web application" may be configured to perform a single task or multiple tasks for a user. In such an implementation, the web application may be configured to be executed or interpreted by the web browser. This is compared with native applications that include machine executable code and are configured to be executed directly by a processor or via the operating system of the client computing device, whereas a web application may be incapable of execution or display without the aid of the web browser. Thus, web applications can be run inside a browser with a dedicated user interface, and typically provide functionality and an experience that is more rich and interactive than a standalone website but less cumbersome and monolithic than a desktop application. Examples of web applications include office applications, games, photo editors, and video players that are run inside the browser.

Web applications can be "hosted applications" or "installable applications" (also known as "packaged applications"). Hosted applications may include at least a portion of a web site that itself includes web pages, plus some metadata that may be especially pertinent to the web application or to the user of the web application to allow the web application to perform some particular functionality for the user. Installable applications can be thought of as web applications whose code is bundled, so that the user can download all of the content of the web application for execution by the browser. An installable web application may not need to have network access to perform its functionality for the user, and rather may be executed successfully by the browser locally on the computing device without access to a network. Installable web applications have the option of using Extension APIs, allowing packaged applications to change the way the browser behaves or looks.

In various implementations, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific). Web applications do not combine with other applications in this way. Rather, web applications run stand-alone, like any regular website.

When installable web applications are "installed" on the client computing device, the web applications may be added to and integrated with the web browser. Installation can include adding a shortcut to an application launcher area of the browser. An installation also allows web applications to obtain increased privileges without having to prompt the user for each one individually. Special user interface treatments may apply for the web application's tabs or windows. "Installing" a web application may include integration with: a client computing device's operating system's task and window managers for easy window switching, a taskbar or quick-launch system, interoperating system notification(s), or persistently running background processes. Uninstallation allows for easy removal or deactivation of an installed application from the user's browser or system, and may include revoking all associated privileges. A server-side flag can be used to disable applications remotely.

Browser extensions and web applications can be created for installation in and execution by a browser running on a client computing device. Users who download browser extensions and web applications to the client computing device may get additional functionality for browser extensions and web applications that are installed from a trusted location, such as a trusted digital goods marketplace. Additional functionality may also be included for a web application that has a trusted company or a trusted developer as the author of the web application.

Within the user interface 200, the installable web applications can be displayed in a manner that is organized to help a user decide which applications may be useful or relevant to the user. For example, the user interface 200 can include a category 212 of applications represented by icons 206A, 206B, 206C, 206D, 206E, 206F that have been recently released in the marketplace and which a curator of the marketplace may deem to be especially noteworthy to users. In one implementation, the applications represented by icons 206A, 206B, 206C, 206D, 206E, 206F shown in the category 212 can be limited to applications that have been released in the marketplace within a recent period of time (e.g. one week, one month, three months, six months). Then, a subset of the applications that have been released into the marketplace within the recent period of time can be selected based on a variety of signals that indicate the noteworthiness of the selected applications to the user, and the selected subset of applications represented by icons 206A, 206B, 206C, 206D, 206E, 206F can be displayed within the category 212. That is, the applications represented by icons 206A, 206B, 206C, 206D, 206E, 206F shown in the New and Noteworthy category 212 of the user interface 200 can be a subset of a larger number of applications that also could qualify as being new and noteworthy but which have not been selected for display in the user interface 200. A variety of signals that can be used to rank and select the subset of applications as described in more detail below.

In another example, the user interface 200 can include a category 214 of applications represented by icons 208A, 208B, 208C, 208D, 208E that have been selected to be featured for display in the user interface 200. The applications represented by icons 208A, 208B, 208C, 208D, 208E that are selected to be featured in the category 214 can be selected based on criteria evaluated by a curator of the market place. For example, the curator may select the applications represented by icons 208A, 208B, 208C, 208D, 208E for display in the category 214 from a much larger set of applications based on the curator's opinion of the quality, popularity, or utility of the selected applications. In another implementation, the curator may select the applications represented by icons 208A, 208B, 208C, 208D, 208E based upon payments made by developers of the applications in return for prominent display of the applications in the user interface 200.

In another example, the user interface 200 can include a category 216 of applications represented by icons 210A, 210B, 210C that have been selected for display in the category 216 of the user interface 200 based on a popularity ranking of the selected applications relative to other applications. The popularity ranking can be determined based on reviews of the applications by users who have downloaded and used the applications. For example, the marketplace may request that users rate applications quantitatively using a system of one to five stars, where five stars is the highest rating, and one star is the lowest rating. Then, applications within the marketplace can be ranked based on their user rating. In one implementation, applications with the highest average rating can be ranked highest. In another implementation, applications with the highest number of five-star ratings can be ranked highest. Then, applications represented by icons 210A, 210B, 210C with the highest rankings can be selected for display in the user interface 200 of the marketplace.

The user interface 200 of the marketplace also can include categories of applications in other subportions of the user interface 200 in which smaller icons are used to represent the applications that are used in categories 212, 214, 216. For example, category 218 can display "Favorite Paid Apps," which can be applications for which a user must pay money before being able to download and install the application on the user's computing device. Applications listed in the Favorite Paid Apps category 218 can be the most frequently downloaded and/or most frequently installed applications for which the user must pay money. In another example, category 220 can display "Staff Picks," which can be applications that are selected by a curator at the marketplace based on the selected applications being deemed especially interesting to users who visit the marketplace in search of applications.

Within the user interface 200, categories 212, 214, 216, 218, 220 can display a subset of applications that are categorized to fall within the category. Because screen space within the user interface is limited, only a subset of the applications that fall within a category may be displayed within the user interface 200. However, by selecting a hyperlink associated with the category, more applications that fall within the category can be displayed to a user. For example, each category 212, 214, 216, 218, 220 is associated with a hyperlink labeled "All," the selection of which may cause more applications that fall within the category to be displayed.

Other parts of the user interface 200 also can be used to organize the digital goods that are available in the marketplace. For example, an "Apps" section 222 can provide a list of hyperlinks, which each can be selected to display applications that belong to a category identified by the hyperlink. For example, selection of the "Education" hyperlink 223 can cause a group of icons that represent applications related to educational topics to be displayed. In another example, an "Extensions" section 224 can provide a list of hyperlinks, which each can be selected to display extensions that belong to a category identified by the hyperlink, where an extension is executable code that extends the functionality of a browser. For example, selection of the "Sports" hyperlink 225 can cause a group of icons that represent extensions related to sports topics to be displayed.

In addition to locating digital goods (e.g., Web applications and extensions) that are already displayed within a category 212, 214, 216, 218, 220 of the user interface 200, which could be displayed as a result of selecting a hyperlink 213, 223, 225, digital goods also can be located as a result of a query for goods that may be of interest to the user. For example, a user may enter query terms into an query box 226 that may receive the query terms and pass the terms onto a search engine that then locates digital goods that match the query terms and that are available in the marketplace. For example, digital goods such as web applications can have a variety of metadata associated with them that are used to index the digital goods, and the query terms can be compared to the metadata associated with the digital goods. Based on the comparison, applications that best match the query terms can be selected from the digital goods available in the marketplace, and the selected goods can be presented to the user in the user interface 200.

The user interface 200 also includes a hyperlink 227 that can be selected so that the user can log into the marketplace. For example, selection of the hyperlink 227 can trigger the display of a prompt to the user to enter a username and password, and successful entry of the username and password may allow the user to log into a personal account associated the marketplace. As explained in more detail below, once the user is logged into the marketplace, digital goods can be selected and presented to the user within the user interface 200, where the selection of the goods can be personalized to the user based on data associated with the user's account.

Figure 3:
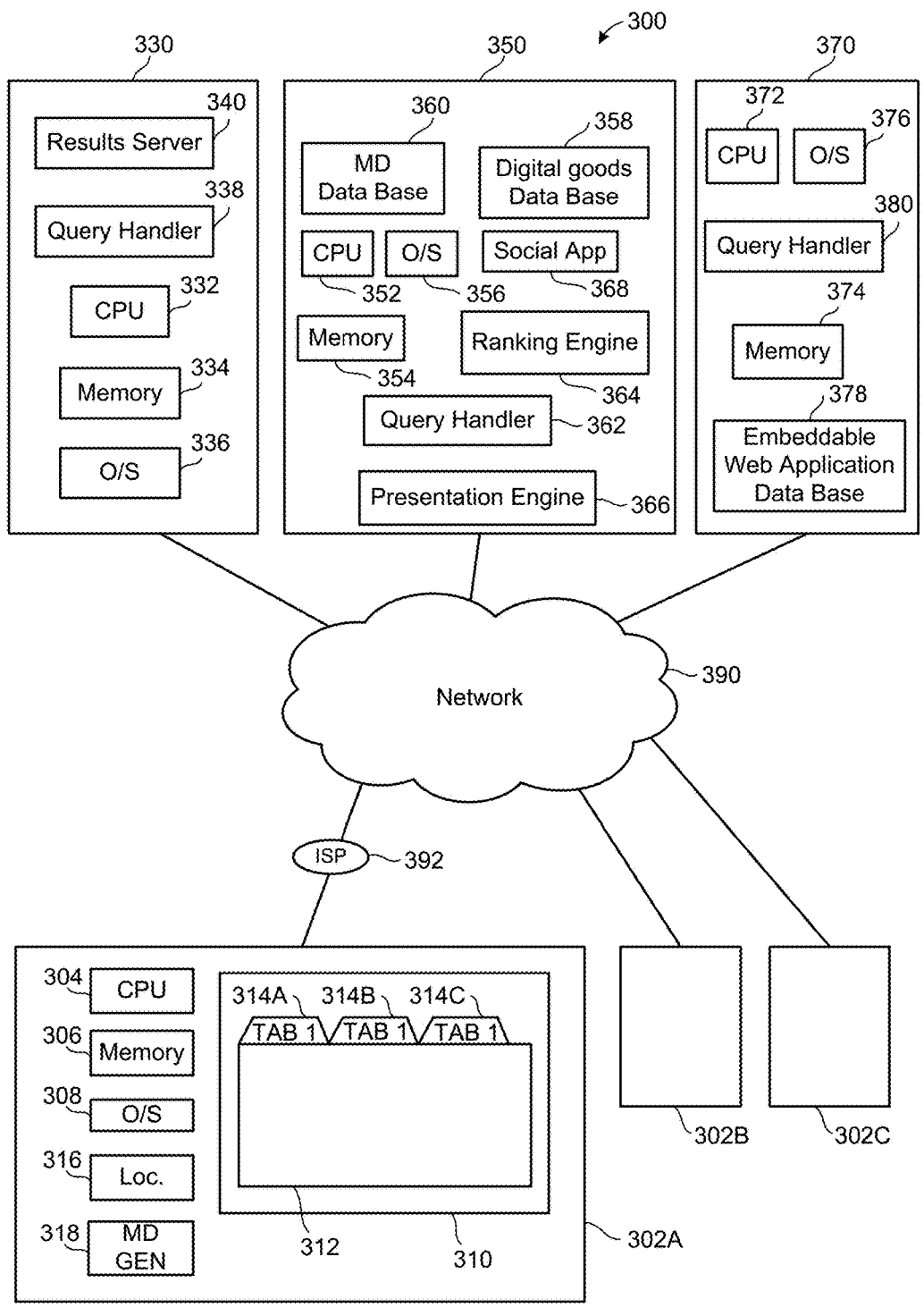
FIG. 3 is a schematic diagram of a system for distributing digital goods in a marketplace.

FIG. 3 is a schematic block diagram of an example embodiment of a system 300 for distributing digital goods in a marketplace. In various embodiments, the system 300 may include client computing devices (e.g., desktop computers, notebook computers, netbook computers, tablet computers, smart-phone, etc.) 302A, 302B, 302C. A client computing device 302A can include one or more processors 304 and one or more memories 306. The client computing device 302A can execute an operating system 308 and a browser application 310 that which may display a user interface window 312. The client computing device 302A can include a location detector 316, which may automatically detect a location of the computing device, for example, based on global positioning system (GPS) signals, or by triangulation of signals from transmitters at known locations, or by using other hardware and/or techniques.

In one embodiment, the client computing device 302A may be running or causing the operating system 308 to execute an application 310 or window 312. For purposes of illustration, the window 312 is referred to as a web browser. However, it is understood that the above is merely one illustrative example to which the disclosed subject matter is not limited. In various embodiments, this window 312 may include a plurality of panes or tabs 314A, 314B, 314C. The window 312 can be a visual area, usually rectangular, containing some kind of user interface. In a graphical user interface (GUI) used in the client computing device 302A, the window 312 can be a two-dimensional object arranged on a plane of the GUI known as the desktop. The window 312 can include other graphical objects, e.g., a menu-bar, toolbars, controls, icons and usually a working area in which the document, image, folder contents or other main object can be displayed. The working area may be capable of holding only one main object (i.e., in a single document interface) or more than one main object in a multiple document interface. In some applications, specifically web browsers, multiple documents can be displayed in individual tabs 314A, 314B, 314C. These tabs 314A, 314B, 314C are typically displayed one at a time, and are selectable via a tab-bar which often resides above the contents of an individual window. That is, one selected tab 314A is "forward-facing" and displays information or content to a user in the window 312, with the content of other tabs 314B, 314C is "hidden."

The client computing devices 302A, 302B, 302C may receive online content from one or more server computing devices 330, 350, 370, that may be connected to the client computing device 302 through a network 390. Each of the client computing devices 302A, 302B, 302C can be connected to the network 390 through a local Internet Service Provider (ISP) 392. The received online content can be processed and displayed in the window 312 (e.g., in a on a tab 314 of the window 312). For example, the window 312 can display a user interface of a marketplace for digital goods, similar to the user interface of the marketplace described herein, to a user. A user can interact with the displayed content, and an activity metadata generator 318 can monitor the user's interactions with the content and the performance of the application 310 and can generate activity metadata based on the user's interactions with the content and based on the performance of the application 310.

A location of the client computing device 302A can be determined based on a location associated with the ISP 392. For example, a known location of the ISP can be used as an approximation or as a proxy for the location of the client computing device 302A.

The client computing device 302A can communicate with a digital goods marketplace server 350 that provides a marketplace for digital goods to client computing devices 302A, 302B, 302C. The marketplace server 350 can include one or more processors 352 and one or more memories 354. The marketplace server 350 can execute an operating system 356 and various applications and services to provide functionality to the client computing devices. For example, in one implementation, the marketplace server 350 can include a repository for database of digital goods database 358, and the digital goods can be served from, or downloaded from, the repository to the client computing devices 302A, 302B, 302C. In another implementation, the digital goods can be stored in, and served to client computing devices 302A, 302B, 302C from, a repository that is remotely located from the marketplace server. For example, digital goods could be stored and served to client computing devices 302A, 302B, 302C from individual repositories that are operated and controlled by developers of the digital goods, and digital goods database 358 of the marketplace server 350 can provide just a reference to the individual repositories that are operated by the developers.

The marketplace server 350 can include a metadata database 360 that stores metadata associated with the digital goods that are available from or referenced by the digital goods database 358. The metadata associated with a digital good can include a variety of information about the digital goods including, for example, information about the digital goods that are available from the digital goods database 358. Such information can include, for example, representative keywords associated with the digital goods, the price associated with the digital goods. The metadata may also include demographic data about targeted users of the digital good, a time of year month or day during which the digital goods may be of the highest interest to a user, etc. For example, metadata associated with the surfing videogame may indicate that the good is intended for use by male users between the ages of 15 and 34, who live in coastal California or Hawaii, and that the game may be more popular during summer months than during winter months.

The marketplace server 350 can include query handler 362 that can be configured to receive and process queries for digital goods available in the marketplace. For example, the query handler can receive queries for digital goods that are entered into query box 326 of the user interface 200 shown in FIG. 2. Terms or phrases of the queries then can be compared to terms and phrases (e.g., terms and phrases stored in the metadata database 360) that are used to index the digital goods available in the marketplace. Based on the comparison, a subset of digital goods can be selected from the digital goods database 358 with which to respond to the query.

The marketplace server 350 can include a ranking engine 364 that is configured to rank digital goods based on signals relevant to the relative desirability of the goods to a user, where at least one of the signals is based on information that is generated outside the marketplace. For example, the goods can be ranked based on their price in the marketplace, but a signal such as price is generated within the marketplace because the prices are relevant only within the marketplace. However, as described herein, other signals can be generated outside the marketplace and used by the ranking engine to rank the relative desirability of goods to a user.

The marketplace server 350 can include a presentation engine 366 that prepares information for transmission to the client computing devices 302A, 302B, 302C, where the information is used by the client computing devices to display a user interface 200 that shows representations of selected digital goods available in the marketplace. For example, based on the output of the ranking engine 364, the presentation engine 366 can prepare HTML code, XML code, etc. that determines the information that is displayed to a user in the user interface 200 and where the code determines which digital goods will be displayed in the user interface 200 to the user.

In at least one implementation, embeddable web applications displayed in an embeddable web application gallery can be ordered, filtered and/or limited based on a ranking of at least one web application. By ordering, filtering and/or limiting web application, users of the client computing device 302A, 302B, 302C can be directed to select preferred or desired web applications. Accordingly, the ranking engine 364 can use a variety of signals to rank the relative desirability to the user of different digital applications available in the marketplace, where some of the signals can be based on information that is generated outside of the marketplace. In one implementation, the signals used by the ranking engine 364 can be based on how a web application available from the marketplace is used by a client computing device or how a web application performs when utilized by a client computing device 302A, 302B, 302C.

In one implementation, a signal used by the ranking engine can be based on how often a digital good available from the marketplace is used on a client computing device 302A, 302B, 302C, after the digital good is downloaded from the digital goods database 358 to the client computing device for execution on the client. For example, when a web application is downloaded from the digital goods database 358 and is executed by a browser application 310 running on the client computing device 302A, the browser application can monitor each time the web application is launched within the browser and can report this information to the ranking engine 364. The ranking engine 364 then can rank the applications based on how often they are launched by client computing devices after they are downloaded. For example, an application that is launched frequently can be ranked higher than an application is launched less frequently.

The browser application 310 also can monitor and gather information about how often a user interacts with a web application after the web application has been downloaded from the digital goods database 358 and launched within a browser application 310 of the client computing device 302A. For example, the browser application 310 can provide a window 312 that can include multiple tabs 314A, 314B, 314C, where one tab can be front-facing while other tabs are hidden. The browser application 310 can monitor how often a web application that is launched in the browser is front-facing, as opposed to hidden, and this information can be provided to the ranking engine 364 to provide an indication of how often a user interacts with the web application. The ranking engine 364 then can rank with applications based on how frequently a user interacts with the applications after they are downloaded. For example, an application with which a user interacts frequently can be ranked higher than an application with which a user interacts less frequently.

In another implementation, a signal used by the ranking engine can be based on at least one application performance metric. Examples of such application performance metrics may include: a rate at which a web application available from the marketplace crashes while being executed by a client computing device 302A, 302B, 302C, a response time of a web application while being executed by a client computing device 302A, 302B, 302C, or a system resource (e.g., processor usage, network bandwidth usage, etc.) usage or consumption a web application while being executed by a client computing device 302A, 302B, 302C, etc. It is understood that the above are merely a few illustrative examples to which the disclosed subject matter is not limited.

For example, in one other implementation, a signal used by the ranking engine can be based on a rate at which a web application available from the marketplace crashes while being executed by a client computing device 302A, 302B, 302C. In one implementation, after downloading a digital good from the marketplace server 350 to the client computing device 302A, the digital good can be executed by an application 310, and the application can provide feedback to the marketplace server 350 about the performance of the digital good. For example, a web application can be downloaded from the digital goods database 358 and installed on the client computing device 302A for execution by a browser application 310. Then, the browser application can monitor the performance of the web application, and the frequency with which the web application crashes.

The information that is provided by an application 310 running on a client computing device to the marketplace server 350 (e.g., regarding how a web application is launched, how often the user interacts with a web application, how often a web application crashes, etc.) can be provided on an opt-in basis. In other words, such information may be provided from the client computing device 302A to the marketplace server 350 only if the user of the client computing device specifically authorizes the transmission of such information from the client to the server.

Because the browser application 310 can communicate easily over the network 390, the browser application can provide feedback to the ranking engine 364 of the marketplace server about the local usage of the web application on the client computing device. By receiving such feedback from many client computing devices 302A, 302B, 302C, the ranking engine 364 can gather a great deal of information about how an application is actually used after it is downloaded from the marketplace server 350. Thus, the ranking engine 364 has the ability to rank digital goods available from the marketplace server 350 based on signals relevant to the relative desirability of different applications to users, where such signals can include signals based on information about how applications are actually used, or how applications actually perform, after the applications are downloaded from the marketplace server 350 and installed on a client computing device. Moreover, by using signals that are automatically generated as the web applications are used, the ranking of the digital goods in the marketplace can be somewhat more objective than rankings based on subjective user reviews based on users' experience with the web application, which users may enter directly into the marketplace server 350 (e.g., by adding metadata information about a digital goods to the metadata database 360).

The above-described signals are but a few examples of signals based on information that is generated outside of the marketplace and that is relevant to the relative desirability to the user of different applications that are available from the marketplace. Other signals also can be used by the ranking engine 364.

In another example implementation, signals based on information that is generated outside of the marketplace and that are used by the ranking engine 364 for ranking the relative desirability of digital goods available marketplace can include signals based on information provided by a search engine. For example, in one implementation, such signals can be based on recent trends in query terms received through a search engine.

As shown in FIG. 3, the system 300 can include a search engine server 330 that includes one or more processors 332, one or more memories 334, an operating system 336, a query handler 338, and a result server 340. The query handler 338 can receive queries that include one or more query terms or query phrases from client computing devices 302A, 302B, 302C, and a result server 340 can provide search results in response to the queries. The search engine server 330 can monitor the query terms and phrases received from client computing devices, and based on the query term traffic the search engine server 330 can generate statistics about trends in users' interests. For example, when a previously-unknown singer becomes a star entertainer, trends in query term traffic may reveal that users are becoming more interested in discovering information about the singer. Similarly, when a movie or a game becomes popular, trends in the search engine traffic received to the search engine server 330 can automatically reveal the increase in the popularity. In another example, search engine trends can be driven by seasonal factors, such as search queries for "costumes" rising in the weeks before Halloween, or queries for the purchase of products rising during the winter holiday season.

Such trends in query term traffic can be provided by the search engine server to the marketplace server 350, so that the ranking engine 364 of the marketplace server can rank digital goods available in the marketplace based on trends in query traffic. For example, the ranking engine 364 can boost or lower the relative ranking of individual digital goods available in the marketplace server 350 based on search engine traffic. Thus, for example, when search engine traffic reveals that a game or a movie is becoming popular, and such information is provided to the ranking engine 364, the ranking engine can boost the ranking of web applications that are related to the game or the movie.

In another example implementation, signals based on information that is generated outside of the marketplace and that are used by the ranking engine 364 for ranking the relative desirability of digital goods available marketplace can include signals based on information provided by a social network applications or servers. For example, in one implementation, such signals can be based on how digital goods are used by acquaintances of a particular user, and the rankings performed by the ranking engine 364 can be based on such signals and can be specifically tailored for the particular user.

In another example implementation, signals based on information generated inside of, or outside of, the marketplace can be based on how digital goods are used by people with similar preferences to a particular user, and the rankings performed by the ranking engine 364 can be based on such signals and can be specifically tailored for the particular user. For example, different users may tend to like, or present positive quantitative feedback on, different items, such as sports, movies, songs, productivity applications, games, gossip, etc. User preferences can be determined based on feedback provided by the user, and a particular user's preferences can be compared to the preferences of other users. Then, digital goods can be recommended to the particular user, which have been shown to be desirable to other users with similar preferences. Thus, for example, if a particular indicates that he or she likes sports, then one or more signals used to rank digital goods for that user may be based on what digital goods other users who like sports have selected, or based on the applications that such other user use heavily.

For example, the marketplace server 350 (or some other server not shown) can include a social network application 368. The social network application 368 can provide a network, environment, virtual world through which a particular user can interact with selected colleagues, friends, acquaintances (collectively, "friends") of the particular user. For example, the particular user can exchange information with his or her friends about interests that they may share. Thus, a user that downloads a digital good from the marketplace server 350 and installs and executes the digital goods within a client computing device controlled by the user may recommend the web application to the user's friends. Such recommendations pass through the social network application 368, and anonymous information about such recommendations can be gathered (e.g., by the social network application 368 and stored in memory 354) signals based on the social network application 368 and then passed on to the ranking engine 364. The ranking engine 364 then can base its rankings of digital goods in the marketplace on statistical information about such recommendations. For example, the ranking engine 364 can boost the ranking of a web application that has received a large number of recommendations within the context of a social network application 368. In another example, the ranking engine 364 can boost a user-specific ranking of a web application when the web application has been recommended frequently within the context of a social network application by friends of the specific user to their friends.

The ranking engine 364 also can use other signals that are generated outside of the marketplace to generate rankings of digital goods available in the marketplace. In one implementation, the ranking engine 364 can provide rankings specific to a user of digital goods that are available within the marketplace, where the rankings are based in some way on information that is associated with the user and that is generated outside the marketplace. In one implementation, the information associated with the user may include information that the user actively provides or enters (e.g., the user's age, one or more user entered preferences, likes or dislikes, etc.). In one implementation the information associated with a user may include information inferred from user actions (e.g., the user's browsing history, the user clicking on advertisements, etc.) or passively gathered about the user (e.g., the user's location, etc.).

For example, a location associated with the user can be compared to metadata associated with digital goods, and the ranking engine 364 can provide rankings of digital goods based on such comparisons. A location of a user can be determined in a number of ways, including by the location generator 316 or based on a location associated with the ISP 392 through which the user's client computing device communicates with a network 390. The location of a user can be compared to metadata associated with digital goods so that the relevance of digital goods to the user can be ranked based on the user's location. For example, an application that calculates marine tides generally be of low relevance to a particular user who lives far from the coast, and accordingly should be ranked low for the titular user by the ranking engine. Thus, when information about the user reveals that the user lives or is located in Albuquerque, N. Mex., a marine tide web application that is associated with metadata indicating that the application is relevant to coastal users, would have a relatively low ranking for the user.

In another implementation, information associated with the user can include a browsing history of the user that provides information about content (e.g., websites) that the user has accessed through a browser application 310. Metadata about the accessed content, or the content itself, can be compared to metadata associated with digital goods available in the marketplace. Based on the comparison, the ranking engine 364 can provide rankings of the available digital goods to a user that are individually-tailored to the interests of the user, as determined from the browsing history of the user. For example, if the browsing history reveals that the particular user is primarily interested in playing computer or video games, then the ranking engine can boost the user-specific rankings of game applications that are available in the marketplace.

The information that is provided by an application 310 running on a client computing device to the marketplace server 350 (e.g., regarding a user's browsing history, etc.) can be provided on an opt-in basis. In other words, such information may be provided from the client computing device 302A to the marketplace server 350 only if the user of the client computing device specifically authorizes the transmission of such information from the client to the server.

As shown in FIG. 3, the system 300 can include an embeddable web application server 370 that includes one or more processors 372, one or more memories 374, an operating system 376, an embeddable web application database 378 and a query handler 380. The embeddable web application server 370 may be configured to enable installation of embeddable web applications, configure embeddable web applications, and associate embeddable web applications with one or more digital good (e.g., as stored in digital goods database 358). The embeddable web application database 378 may be configured to store information about one or more embeddable web application. For example, the embeddable web application server 370 may be configured to enable a developer to install a web application, to load a web application on the marketplace server 350 and configure the web application as an embeddable web application on the embeddable web application server 370. Alternatively, the embeddable web application server 370 may be configured to enable a developer to configure a web application that was previously loaded on the marketplace server 350 as an embeddable web application on the embeddable web application server 370.

Configuring the web application may include storing information, in the embeddable web application database 378, relating the web application to another application (e.g., an email application, a hosted file system or drive application, an enterprise application, a file type, an office application, etc.). In an example implementation, the web application may be a script configured to operate on an application (e.g., a spreadsheet application). Therefore, configuring the web application may include storing information relating the web application (as a script) to execute on an application or an element (e.g., graph within the spreadsheet application) of the application.

The embeddable web application server 370 can include the query handler 380 that can be configured to receive and process queries for embeddable web applications available in the marketplace. For example, the query handler 380 can receive queries and/or parameters used to generate a query for embeddable web applications that are requested by a client computing device 302A, 302B, 302C using a web browser. Terms or phrases of the queries then can be compared to terms and phrases (e.g., terms and phrases stored in the embeddable web application database 378) that are used to index the embeddable web applications available in the marketplace. Based on the comparison, a subset of embeddable web applications can be selected from the embeddable web application database 378 with which to respond to the query. The response may include information stored in the embeddable web application database 378, the metadata database 360, and/or the digital goods database 358. Accordingly, the query handler 380 may be configured to join tables included in any database within system 300.

Figure 4A:
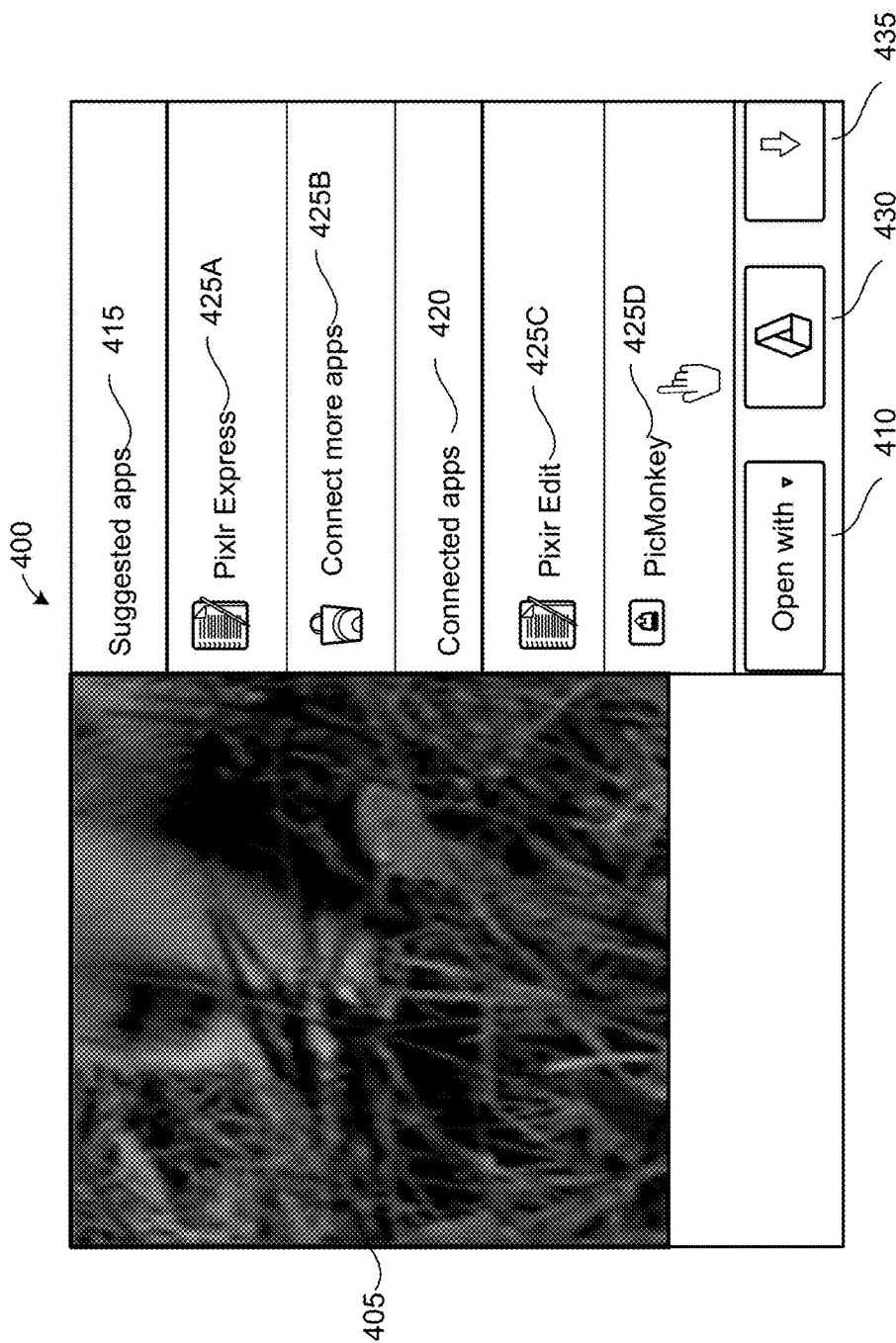
FIGS. 4A and 4B are screenshots of another user interface for an embeddable web application gallery.
Figure 4B:
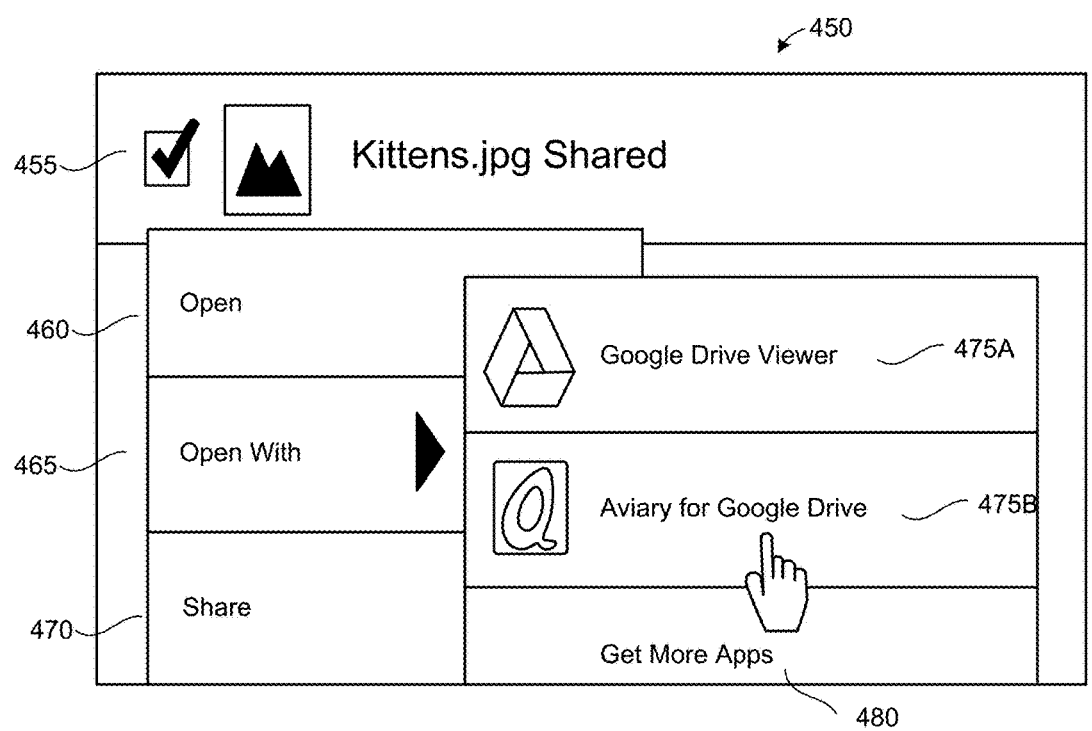

FIGS. 4A and 4B are screenshots of a user interface 400 and 450, respectively, for an embeddable web application gallery. The user interface 400 and/or 450 can be displayed by a browser application (e.g., as a pop-up HTML or iFrame window) that is executed by a computing device that may be connected to a network (e.g., the Internet). The browser application can open one or more tabs, one of which may display the user interface 400 and/or 450 when a user interacts with some triggering event (e.g., a mouse click on a button) associated with an application or webpage being displayed by the browser application.

The user interface 400 may display a list of web applications. The list of web applications may be a filtered list. The filter may be based on an application associated with a browser (e.g., email, photo editor, file storage, office application, etc.) executing on the client computing device. For example, the user interface 400 may be associated with an email application attachment. The list of web applications may be web applications indicated as configured to operate on the application associated with a browser, a file type, and/or the like. For example, element 405 may be a thumbnail of a picture file attached to an email message displayed within the email application. When a mouse pointer hovers over element 405 (or some other triggering event), the user interface 400 or embeddable web application gallery may open as a pop-up HTML or iFrame window to the side of element 405. The user interface 400 may include one or more icons 425A, 425B, 425C, 425D organized under headings 415 and 420 or "Suggested apps" and "Connected apps", respectively.

The suggested apps (under heading 415) may be web applications having information stored in embeddable web application database 378. In some implementations, web applications may declare an association between the web application and a file type (e.g., *.jpg, *.tif, etc.) in a manifest file or store the association in the embeddable web application database 378. The connected apps (under heading 420) may be web applications having been previously associated with the client computing device.

By clicking on "Open with" button 410, the user may link to or open another embeddable web application gallery that includes additional web applications not shown under the suggested apps heading 415. For example, as discussed above, web applications may be ranked. Accordingly, the web applications shown under the suggested apps heading 415 may be the top (e.g., top three) ranked web applications that may be associated with element 405. Clicking on button 410 may open an additional embeddable web application gallery (e.g., user interface 150 shown in FIG. 1B) with icons showing additional web applications having information stored in embeddable web application database 378 and associated with element 405. By clicking button 430, the attachment (or file) associated with element 405 may be stored in a hosted file system or drive. By clicking button 435, the attachment (or file) associated with element 405 may be stored in a local file system or drive.

The user interface 450 may be associated with a file stored in a hosted file system or drive or an email attachment. For example, element 455 may be a link to a file stored in a hosted file system or drive. When a mouse pointer hovers over element 455 (or when a check box is clicked, or some other triggering event), the user interface 450 may pop-up a drop down list showing a number of options 460, 465, 470 for the file. Option 465 may open (or pop-up) an HTML window to the side of option 465. The HTML window to the side of option 465 may display a list of preinstalled (by the user) apps which support the given file type.

As discussed above, web applications may be ranked. Accordingly, the web applications represented by icons 475A, 475B may be the top (e.g., top three) ranked web applications that may be associated with the file represented by element 455. Clicking on link 480 may open an additional embeddable web application gallery (e.g., user interface 150 shown in FIG. 1B) with icons showing additional web applications having information stored in embeddable web application database 378 and associated with the file represented by element 455.

Figure 5:
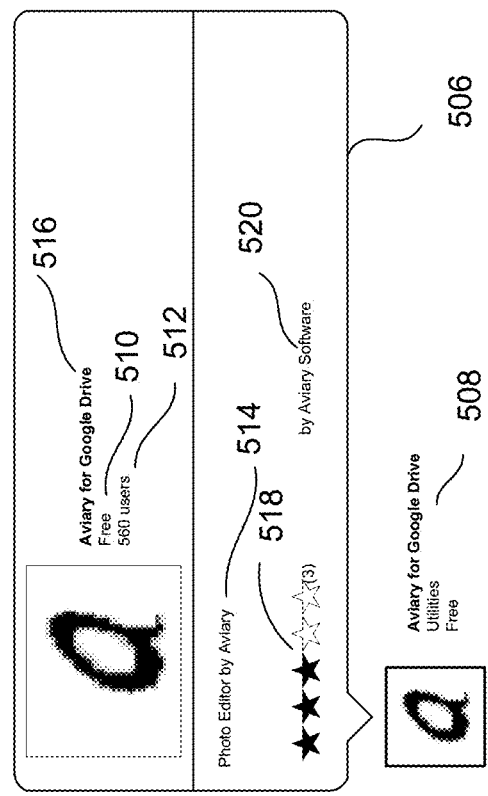
FIG. 5 is a screenshot of a pop-up HTML window.

FIG. 5 is a screenshot of a pop-up HTML window 506 that can be displayed when a user moves a mouse icon over an icon for a web application 508 that is displayed in a user interface (e.g., user interface 100, 200, 400 and/or 450). Within the pop-up HTML window 506, additional information about the web application 508 can be displayed. For example a field 510 can indicate whether the application is free or can indicate the price that must be paid to be able to download and install the app. Another field 512 can indicate how many users have downloaded and/or installed and/or used the application. Information about the installation and/or use of the application on a client computing device can be transmitted from a browser executing the application of the client computing device to the marketplace server 350. Another field 514 can display descriptive information about the web application that supplements information in the title field 516. Another field 518 can display an average subjective rating that users have provided of the web application and a number of users that have rated the application. Another field 520 can display the name of the author or developer of the application.

Figure 6:
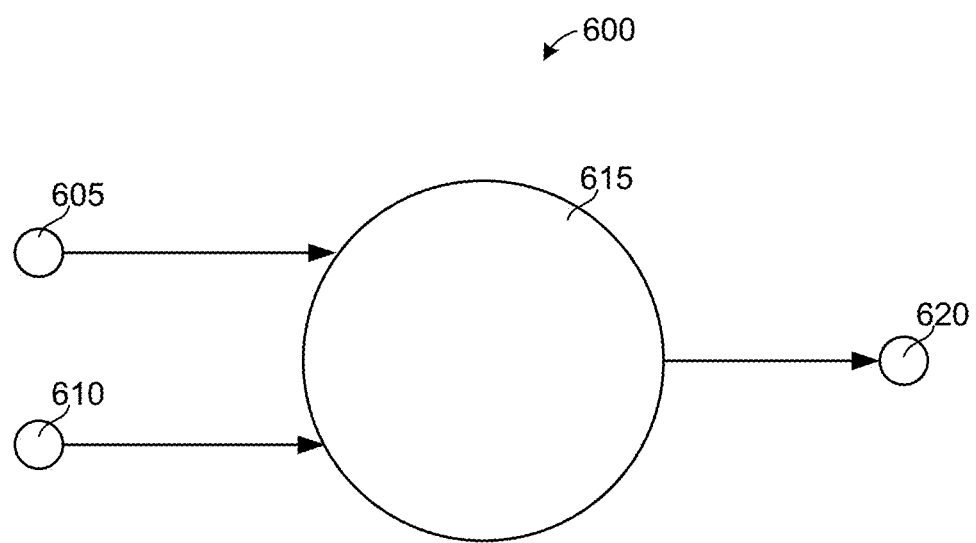
FIG. 6 is a state diagram for an embeddable web application gallery.

FIG. 6 is a state diagram 600 for an embeddable web application gallery. The state diagram includes an input or initiation event 605, an input information 610, an embeddable web application gallery widget 615, and an output event 620. An application developer (e.g., developer of an email application or hosted file system or drive access application) may have access to the embeddable web application gallery widget 615 as add-on code for the application in development and/or as an upgrade. The developer associates an event 605 to trigger execution of the embeddable web application gallery widget 615 (e.g., as pop-up HTML or an iFrame window). For example, the event may be an OnClick event or an OnHover event based on a mouse click or a user gesture on a touch pad or touch screen. The developer also associates input information 610 to support execution of the embeddable web application gallery widget 615. For example, in an email attachment application a file type for the application may be associated with the input information 610.

The output event 620 may be associated with installation of a web application as selected using the embeddable web application gallery widget 615. For example, the output event 620 may trigger opening a web page displaying a user interface to a marketplace of digital goods (e.g., user interface 200). The web page may be opened with the result of a query based on the selected web application so that the user can install the web application. In another implementation, the output event 620 may trigger opening a web page configured to enable installation of the selected web application. In another implementation, the output event 620 may trigger direct installation of the selected web application.

Figure 7:
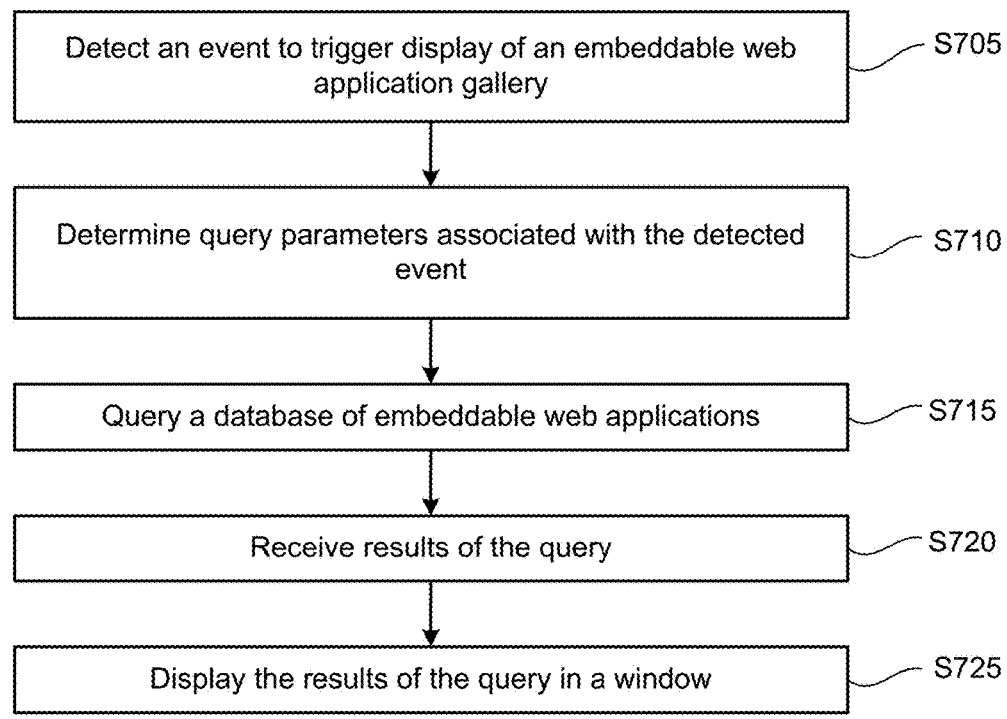
FIG. 7 is a flowchart of a process for generating an embeddable web application gallery user interface.
Figure 8:
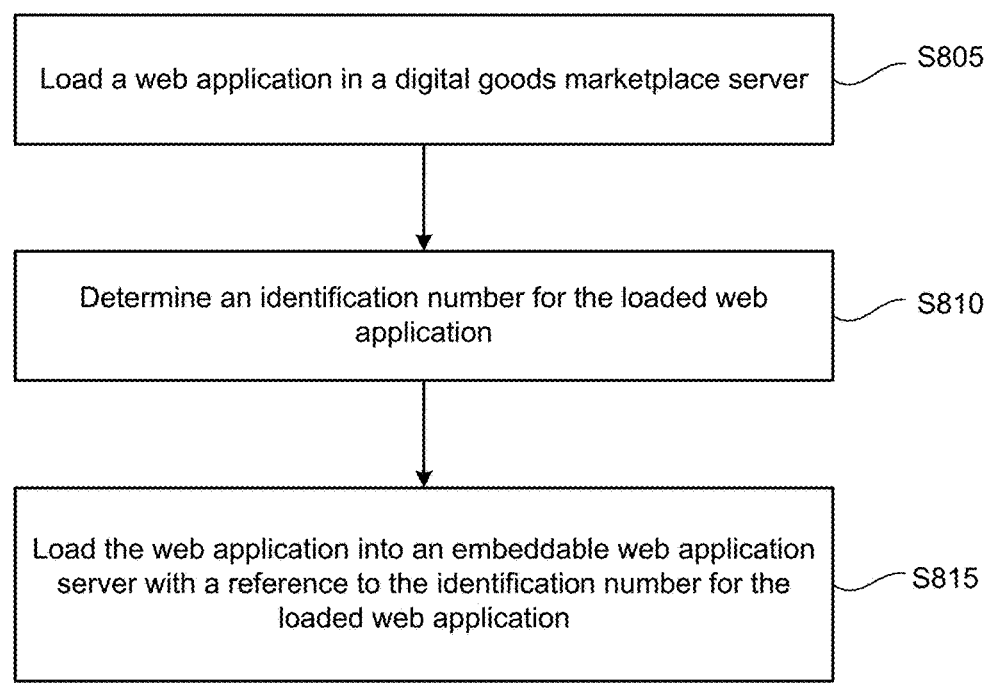
FIG. 8 is a flowchart of a process for adding an embeddable web application.
Figure 9:
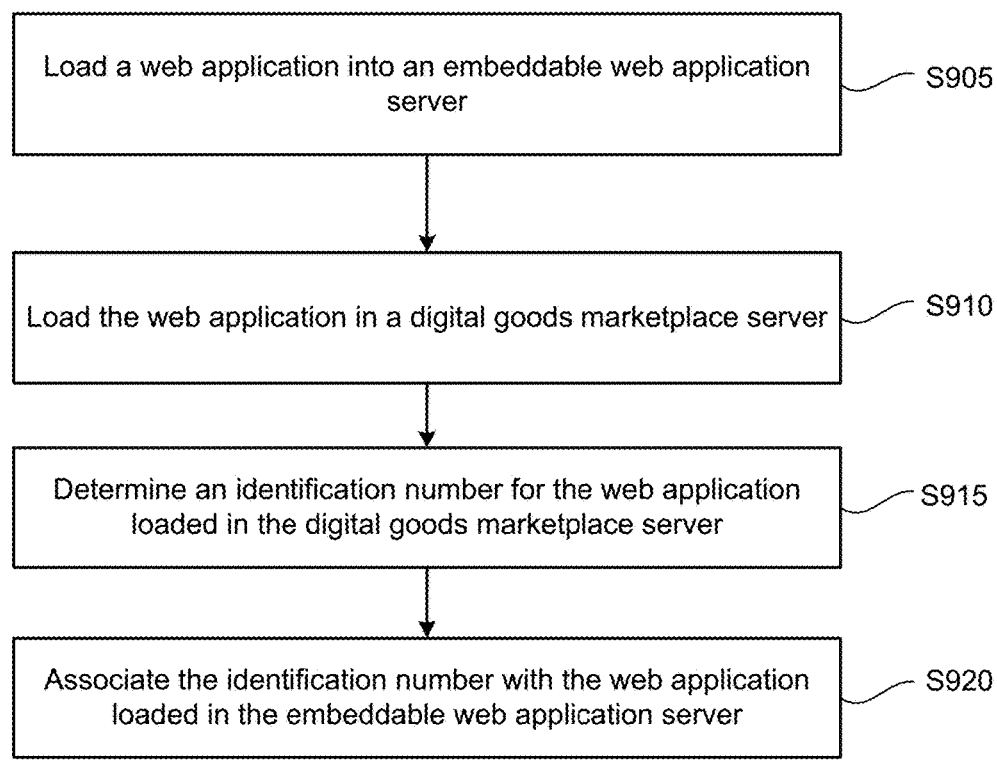
FIG. 9 is another flowchart of a process for adding an embeddable web application.

FIGS. 7-9 are flowcharts of methods according to example embodiments. The steps described with regard to FIGS. 7-9 may be performed due to the execution of software code stored in a memory (e.g., at least one memory 306, 334, 354, 374) associated with an apparatus (e.g., as shown in FIG. 3) and executed by at least one processor (e.g., at least one processor 304, 332, 352, 372) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 7-9.

FIG. 7 is a flowchart of a process for generating an embeddable web application gallery user interface. As shown in FIG. 7, in step S705 an event to trigger display of an embeddable web application gallery is detected. For example, a button may be clicked on, an element of a web page may be hovered over, a file may be selected and/or a link may clicked on. A mouse click may be a left click and/or a right click. Other events are also contemplated. For example, a gesture on a track pad or a touch screen may trigger the event.

In step S710 query parameters associated with the detected event are determined. The query parameters may be based on an application being executed in a browser of the client computing device 302A. In other words, an event may be associated with an action that may occur in an application being executed in a browser. For example, if the event (e.g., hover over, click on, etc.) is associated with a file type (e.g., as an attachment in an email application), the query parameters may be based on the file type. For example, if the event is associated with a user logged on to an enterprise computing system, the query parameters may be based on the enterprise system (e.g., to determine applications developed for use on the enterprise system) and/or the logged on user. For example, if the event is associated with a hosted file system or drive application (e.g., Google Drive®), the query parameters may be based on the hosted file system or drive application. For example, if the event is associated with a script (e.g., code segments configured to operate on or within a file), the query parameters may be based on the script and/or files for which the script is configured to operate on and/or scripts that can operate on a file. Other query parameters are contemplated and within the scope of this disclosure.

In step S715 a database of embeddable web applications is queried. For example, embeddable web application database 378 may be queried using the determined query parameters. In addition, digital goods database 358 may be queried using the determined query parameters. In an example implementation, query handler 380 may generate a query using the determined query parameters. In an example implementation, query handler 380 may join tables from embeddable web application database 378, the metadata database 360 and the digital goods database 358 based on an identification number or key associated with a web application to query information stored in both the embeddable web application database 378 and the digital goods database 358. The query handler 380 may generate the query and return the results of the query.

In step S720 the results of the query are received. For example, the results may include a list (e.g., data set) including one or more web application associated with the aforementioned query parameters (e.g., web applications associated with a file type). For example, a client device 302A may receive the list of web applications from network device (e.g., embeddable web application server 370) associated with a digital goods marketplace (e.g. digital goods server 350). Further, the client device 302A may receive metadata (e.g., associated with metadata database 360 and/ or digital goods database 358) associated with the list of web applications. The metadata including an icon associated with each web application in the list of web applications. In other words, the results may also include information (e.g., as metadata) associated with each web application. The information may include an icon, a ranking, a price, number of down loads, metadata, a manifest, and the like. For example, the information may include information for use in generating a user interface such as user interface 100, 400 and/or 450 and/or a pop-up HTML window such as pop-up HTML window 506. For example, the results list or data set may be an ordered list based on a ranking (described above) of each web application.

The list or data set is a list of web applications representing web applications that can operate on or execute a file within the context of a browser. In an example implementation, the list or data set is a list of web applications representing web applications, available for download from the digital market place, that can be utilized to generate a file to be stored in the hosted file system. In an example implementation, the list or data set is a list of web applications represent web applications, available for download from the digital market place, that can be utilized to operate one (e.g., open, edit, etc.) a file attached to an email. In an example implementation, the list or data set is a list of web applications represent web applications, available for download from the digital market place, including scripts that can be executed in association with the application. In an example implementation, the list or data set is a list of web applications represent web applications, available for download from the digital market place, that are associated with the enterprise application. An enterprise application may be, for example, a web application (or group of web applications) developed for use by a corporate entity (or group of corporate entities) that is restricted (e.g., through a user authentication) for distribution to users or user devices associated with the corporate entity.

In step S725 the results of the query are displayed in a window. For example, the client device 302A may generate a user interface including at least one icon representing a web application available for download from the digital goods market place. For example, as shown in FIGS. 1, 4A and 4B, a user interface 100, 400, 450 may be generated including icons based on the results included in the list or data set. Generating the user interface may include selecting a portion of the web applications in the list of web applications based on a ranking (as described above) of each of the web applications such that the user interface includes only the icons associated with the portion of the web applications. In other words, the user interface may display a subset of the web applications in the received list. For example, results list or data set may be an ordered list and the user interface may display icons for the top (e.g., top five) web applications. An additional action (e.g., clicking on a button) may generate a user interface with one or more remaining web application. The displayed window or user interface may be known as an embeddable web application gallery. The embeddable web application gallery may be configured to display one or more icon associated with an embeddable web application. In an example implementation, the user interface includes at least two headings. A first heading may be associated with a portion of the web applications in the list of web applications based on a ranking of each of the web applications in the list of web applications, and a second heading may be associated with at least one related web application previously installed on the client computing device 302A.

In an example implementation, a selection of a web application for installation on the client computing device may be based on detecting a selection of an icon representing a web application. As a result, the selected web application may be installed on the client computing device 302A from the digital marketplace. By selecting one of the icons, a user of the client computing device (e.g., 302A, 302B, 302C) may select a web application to install or to be installed on the client computing device.

FIG. 8 is a flowchart of a process for adding an embeddable web application. As shown in FIG. 8, in step S805 a web application is loaded into a digital goods marketplace server (e.g., marketplace server 350). For example, the web application can be loaded as a compressed file (e.g., a zip file) including, at least an application (e.g., hosted application, packaged application, or extension) and a manifest file. The compressed file should also contain a few images and any other files that the application may use. For example, the contents of the compressed file and manifest depend on the type of application and its capabilities. For example, a compressed file for a hosted application, a packaged application and/or an extension may include web pages (e.g., HTML5 files) making up the application; scripts or executable code (e.g., JavaScript files) that may execute in conjunction with the web pages; Cascading Style Sheets (CSS) used for describing the look and formatting of the web pages; and a manifest file.

The manifest file may include a name, a description, a version, URL's for external files, a launch web page, container settings (e.g., height and width), backgrounds, icons, keys, permissions, and the like. A code listing for an example manifest file is shown below as LISTING 1.

LISTING 1

```
"name": "Google Mail",
  "description": "Read your gmail",
  "version": "1",
  "app": {
    "urls": [
      "*://mail.google.com/mail/",
      "*://www.google.com/mail/"],
    "launch": {
      "web_url": "http://mail.google.com/mail/"
    }
  },
  "icons": {
    "128": "icon_128.png"
  },
  "permissions": [
    "unlimitedStorage",
    "notifications"]
```

Loading the application may be accomplished using a developer dashboard which may be a software tool used by a developer to upload and maintain web applications developed by a developer. The web application may also be published. Publishing a web application makes the web application visible to the world, and visible in the digital goods marketplace search results.

In step S810 an identification number for the loaded web application is determined. For example, when an application is loaded into the digital goods marketplace server, a unique identification (e.g., app ID) may be assigned to the web application.

In step S815 the web application is loaded into an embeddable web application server with a reference to the identification number for the loaded web application. For example, a new item may be added to the embeddable web application database 378. The new entry may have a field corresponding to the unique identification of the web application in the digital goods marketplace. The new entry may have a field corresponding to the embeddable web application function (e.g., file type, hosted file system or drive, enterprise system, email attachment, script file associations, etc.). In addition, loading the web application as an embeddable web application may include revising the aforementioned manifest file. For example, loading the web application into the embeddable web application server may include loading a manifest file including a declaration of an association between the web application and at least one other web application that may be executed in a browser of a client computing device. A code listing for a manifest file for a web application associated with a hosted file system or drive (e.g., Google Drive®) according to example embodiments is shown below as LISTING 2.

LISTING 2

```
{
  "name": "app_name",
  "version" : "version",
  "manifest_version" : 2,
  "description" : "description_text",
  "container" : "GOOGLE_DRIVE",
  "api_console_project_id" : "YOUR_APP_ID",
```

LISTING 2
-continued

```
  "gdrive_mime_types": {
    "http://drive.google.com/intents/opendrivedoc": [
      {
        "type": ["image/png", "image/jpeg", "image/gif",
  "application/vnd.google.drive.ext-type.png",
          "application/vnd.google.drive.ext-type.jpg",
  "application/vnd.google.drive.ext-type.gif"],
        "href": "http://your_web_url/",
        "title" : "Open",
        "disposition" : "window"
      }
    ]
  },
  "icons": {
    "128": "icon_128.png"
  },
  "app" : {
    "launch" : {
      "web_url" : "http://yoursite.com"
    }
  }
}
```

In the example manifest file of LISTING 2, an associated web application is associated with particular file types (e.g., listed after "type"). For example, the associated file types are image files having the extensions .png, .jpeg and .gif.

In the example of FIG. 8, the web application is loaded in the digital goods marketplace server at some time before the web application is to be used as an embeddable web application. However, as described below with regard to FIG. 9, it is possible to install the web application as an embeddable web application before installing the associated web application. FIG. 9 is another flowchart of a process for adding an embeddable web application.

As shown in FIG. 9, in step S905 a web application is loaded into an embeddable web application server (e.g., embeddable web application server 370). For example, a new item may be added to the embeddable web application database 378. The new entry may have a field corresponding to the unique identification of the web application in the digital goods marketplace (which is left blank at this time). The new entry may have a field corresponding to the embeddable web application function (e.g., file type, hosted file system or drive, enterprise system, email attachment, script file associations, etc.). In addition, loading the web application as an embeddable web application may include revising the aforementioned manifest file.

In step S910 the web application is loaded into a digital goods marketplace server (e.g., marketplace server 350). For example, the web application can be loaded as a compressed file (e.g., a zip file) including, at least an application (e.g., hosted application, packaged application, or extension) and a manifest file. The compressed file should also contain a few images and any other files that the application may use. As discussed above, the contents of the compressed file and manifest depend on the type of application and its capabilities. The manifest file may include a name, a description, a version, URL's for external files, a launch web page, container settings (e.g., height and width), backgrounds, icons, keys, permissions, and the like. A code listing for a manifest file for a hosted file system or drive (e.g., Google Drive®) according to example embodiments is shown above as LISTING 2.

In step S915 an identification number for the web application loaded in the digital goods marketplace server is determined. For example, when an application is loaded into the digital goods marketplace server a unique identification (e.g., app ID) may be assigned to the web application. In step S920 the identification number is associated with the web application loaded in the embeddable web application server. For example, the identification number may be written to the field corresponding to the unique identification of the web application in the digital goods marketplace.

Figure 10:
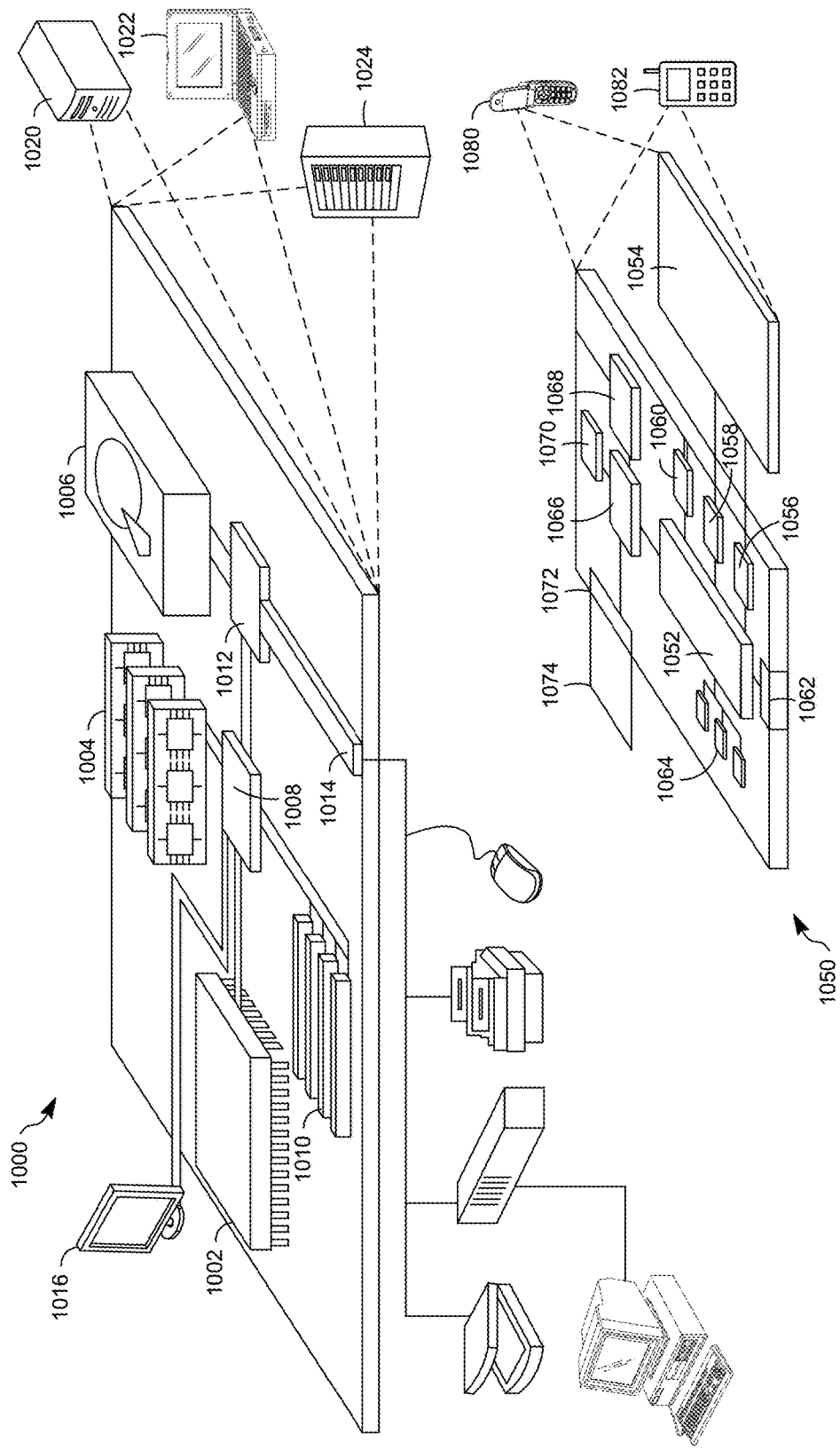
FIG. 10 is a schematic diagram of a computer system that can be used for embedding a web application gallery.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port 1014, which may include various communication ports (e.g., USB) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a BLUETOOTH, WiFi, or other such transceiver (not shown). In addition, GPS (Global Positioning System) receiver module 1060 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made to the implementations described herein.

In addition, the logic flows depicted in the figures do not require the particular order shown, or sequential order. In addition, other steps may be provided, or steps may be eliminated, from the described flows, and other components may be added to, or removed from, the described systems. Accordingly, other implementations are within the scope of the following claims.

What is claimed is:
1. A method comprising:
 selecting an icon representing a file associated with a first web application operating within a browser executing on a client computing device, the file not having a corresponding second web application configured to operate on the file;
 in response to selecting the icon, receiving, at the client computing device, a list of web applications from a network device associated with a digital goods marketplace, the digital goods marketplace including a plurality of web applications, and the list of web applications corresponding to a first portion of the plurality of web applications selected based on:
the file associated with the first web application, and
manifest files associated with each of the first portion of the plurality of web applications, the manifest files including an entry indicating that the corresponding web application is configured to operate on the file associated with the first web application;

in response to selecting the icon, receiving, at the client computing device, metadata associated with the list of web applications, the metadata including an icon associated with each web application in the list of web applications;

in response to receiving, at the client computing device, the list of web applications and the metadata associated with the list of web applications, selecting a second portion of the plurality of web applications from the first portion of the plurality of web applications based on a relevancy to information associated with a user of the client computing device;

in response to selecting the icon, generating, at the client computing device, a user interface including:
an icon representing each web application of the second portion of the plurality of web applications that is available for download from the digital goods marketplace, each web application of the second portion of the plurality of web applications being a candidate for selection via the representative icon as the corresponding second web application, and
a link configured to cause the computing device to display a remainder of the first portion of the plurality of web applications in another user interface; and in response to selecting the icon, displaying the user interface in a browser of the client computing device.

2. The method of claim 1, wherein the list of web applications is based on an application being executed in the browser of the client computing device.

3. The method of claim 1, wherein
the application being executed in the browser of the client computing device is a hosted file system; and
the list of web applications represent web applications available for download from the digital goods marketplace, which can be utilized to generate a file to be stored in the hosted file system.

4. The method of claim 1, wherein
the application being executed in the browser of the client computing device is an email application; and
the list of web applications represent web applications, available for download from the digital goods marketplace, that can be utilized to operate on a file attached to an email.

5. The method of claim 1, wherein the list of web applications represent web applications, available for download from the digital goods marketplace, including scripts that can be executed in association with the application.

6. The method of claim 1, wherein
the application being executed in the browser of the client computing device is an enterprise application; and
the list of web applications represent web applications, available for download from the digital goods marketplace, that are associated with the enterprise application.

7. The method of claim 1, wherein the generating of the user interface is further based on:
selecting the second portion of the plurality of web applications in the list of web applications based on a ranking of each of the web applications in the list of web applications such that the user interface includes only the icons associated with the portion of the web applications.

8. The method of claim 1, wherein
the user interface includes at least two headings,
wherein a first heading is associated with a portion of the web applications in the list of web applications based on a ranking of each of the web applications in the list of web applications, and
wherein a second heading is associated with at least one related web application previously installed on the client computing device.

9. The method of claim 1, further comprising:
detecting an event configured to trigger display of web applications available from the digital goods marketplace; and
determining at least one query parameter based on the event, wherein the list of web applications is based on the at least one query parameter.

10. The method of claim 1, further comprising:
detecting a selection of a web application for installation on the client computing device based on a selection of the at least one icon; and
installing, on the client computing device, the selected web application from the digital goods marketplace.

11. A non-transitory computer readable medium including code segments that, when executed by a processor of a client computing device, cause the processor to:
select an icon representing a file associated with a first web application operating within a browser executing on a client computing device, the file not having a corresponding second web application configured to operate on the file;

in response to selecting the icon, at the computing device, receive a list of web applications from a network device associated with a digital goods marketplace,
the digital goods marketplace including a plurality of web applications, and
the list of web applications corresponding to a first portion of the plurality of web applications selected based on
the file associated with the first web application, and
manifest files associated with each of the first portion of the plurality of web applications, the manifest files including an entry indicating that the corresponding web application is configured to operate on the file associated with the first web application;

in response to selecting the icon, receive metadata associated with the list of web applications, the metadata including an icon associated with each web application in the list of web applications;

in response to receiving, at the client computing device, the list of web applications and the metadata associated with the list of web applications, selecting a second portion of the plurality of web applications from the first portion of the plurality of web applications based on a relevancy to information associated with a user of the client computing device;

in response to selecting the icon, generating a user interface including:

an icon representing each web application of the second portion of the plurality of web applications that is available for download from the digital goods marketplace, each web application of the second portion of the plurality of web applications being a candidate for selection via the representative icon as the corresponding second web application, and a link configured to cause the computing device to display a remainder of the first portion of the plurality of web applications in another user interface;

in response to selecting the icon, display the user interface in a browser of the client computing device.

12. The non-transitory computer readable medium of claim 11, wherein the application is executed in the browser of the client computing device is a hosted file system; and the list of web applications represent web applications available for download from the digital goods marketplace, which can be utilized to generate a file to be stored in the hosted file system.

13. The non-transitory computer readable medium of claim 11, wherein the application being executed in the browser of the client computing device is an email application; and the list of web applications represent web applications, available for download from the digital goods marketplace, that can be utilized to operate on a file attached to an email.

14. The non-transitory computer readable medium of claim 11, wherein the list of web applications represent web applications, available for download from the digital goods marketplace, including scripts that can be executed in association with the application.

15. The non-transitory computer readable medium of claim 11, wherein the application being executed in the browser of the client computing device is an enterprise application; and the list of web applications represent web applications, available for download from the digital goods marketplace, that are associated with the enterprise application.

16. The non-transitory computer readable medium of claim 11, wherein the generating of the user interface is further based on:

Selecting the second portion of the plurality of web applications in the list of web applications based on a ranking of each of the web applications in the list of web applications such that the user interface includes only the icons associated with the portion of the web applications.

17. The non-transitory computer readable medium of claim 11, wherein the user interface includes at least two headings, wherein a first heading is associated with a portion of the web applications in the list of web applications based on a ranking of each of the web applications in the list of web applications, and wherein a second heading is associated with at least one related web application previously installed on the client computing device.

18. The non-transitory computer readable medium of claim 11, wherein the code segments that, when executed by a processor of a client computing device, further cause the processor to:

detect an event configured to trigger display of web applications available from the digital goods marketplace; and determine at least one query parameter based on the event, wherein the list of web applications is based on the at least one query parameter.

19. The non-transitory computer readable medium of claim 11, wherein the code segments that, when executed by a processor of a client computing device, further cause the processor to:

detect a selection of a web application for installation on the client computing device based on a selection of the at least one icon; and install the selected web application from the digital goods marketplace.

* * * * *